United States Patent
Wu

(10) Patent No.: US 9,468,785 B2
(45) Date of Patent: Oct. 18, 2016

(54) COMBINATION OF MOTORBIKE AND FIRE EXTINGUISHING DEVICE

(71) Applicant: Shang-Hua Wu, Taichung (TW)

(72) Inventor: Shang-Hua Wu, Taichung (TW)

(*) Notice: Subject to any disclaimer, the term of this patent is extended or adjusted under 35 U.S.C. 154(b) by 11 days.

(21) Appl. No.: 14/521,485

(22) Filed: Oct. 23, 2014

(65) Prior Publication Data

US 2015/0122514 A1 May 7, 2015

(30) Foreign Application Priority Data

Nov. 4, 2013 (TW) .............................. 102220532 U

(51) Int. Cl.
| | |
|---|---|
| *A62C 25/00* | (2006.01) |
| *A62C 27/00* | (2006.01) |
| *B62J 9/00* | (2006.01) |
| *B62K 19/46* | (2006.01) |
| *A62C 5/02* | (2006.01) |

(52) U.S. Cl.
CPC ............... *A62C 27/00* (2013.01); *A62C 5/022* (2013.01); *B62J 9/001* (2013.01); *B62K 19/46* (2013.01); *B62K 2202/00* (2013.01)

(58) Field of Classification Search
CPC ..................................................... A62C 27/00
See application file for complete search history.

(56) References Cited

U.S. PATENT DOCUMENTS

| | | | | |
|---|---|---|---|---|
| 6,213,237 | B1* | 4/2001 | Willman ....................... | 180/209 |
| 6,845,999 | B2* | 1/2005 | Royal et al. ................. | 280/304 |
| 7,287,774 | B2* | 10/2007 | Mullins ........................ | 280/293 |
| 2005/0212254 | A1* | 9/2005 | Heitner ........................ | 280/298 |
| 2011/0056707 | A1* | 3/2011 | Gamble et al. ................ | 169/14 |
| 2011/0226494 | A1* | 9/2011 | Hosfield et al. ............... | 169/14 |

FOREIGN PATENT DOCUMENTS

CN           2722963 Y  *  9/2005

* cited by examiner

*Primary Examiner* — Arthur O Hall
*Assistant Examiner* — Adam J Rogers

(57) ABSTRACT

A mobile fire extinguishing device includes a motorbike having a base connected to a rear end thereof, and a foam-type fire extinguishing device is connected to the base. Two support units extend from two sides of the base respectively and each support unit has a retractable support rod. A support stand is pivotably connected to the rear end of the base and is positioned either at a retracted first position or an extended second position. When the two support rods are extended, the motorbike is lifted upward and the rear wheel of the motorbike is lifted from the ground. When the support stand is pivoted to the second position, the two support units are retracted, the support stand contacts against the ground so that the motorbike is stable on the ground to bear the reaction force due to the action of the foam-type fire extinguishing device.

7 Claims, 5 Drawing Sheets

COMBINATION OF MOTORBIKE AND FIRE EXTINGUISHING DEVICE

BACKGROUND OF THE INVENTION

1. Fields of the Invention

The present invention relates to a mobile fire extinguishing device, and more particularly, to a foam-type fire extinguishing device connected to a motorbike.

2. Descriptions of Related Art

The conventional fire trucks are too big to enter small roads, tunnels or alleys so that the fire cannot be controlled properly. The fire trucks can only park at a distance from the fire site and the fire men carry light equipment to approach the fire site. However, the equipment can only provide limited fire extinguishing agent so that it may takes a lot of time to completely extinguish the fire.

A combination of a motorbike and a fire extinguishing device is developed to deal with the situations mentioned above. The motorbike has a support stand pivotably connected to the middle portion of the motorbike so that the rider holds the handlebar by one hand and pulls the motorbike backward by the other hand to allow the support stand supports the motorbike. When moving the motorbike, the motorbike is pushed forward and a spring brings the support stand to be pivoted upward. Because the fire extinguishing device is heavy so that when pulling the motorbike backward, the rider has to apply a significant force. Besides, the heavy fire extinguishing device tilt the front end of the motorbike upward, when the fire extinguishing device sprays water or fire extinguishing agent, the reaction force spin the motorbike or even flip the motorbike over.

The present invention intends to provide a combination of a motorbike and a fire extinguishing device to eliminate the shortcomings mentioned above.

SUMMARY OF THE INVENTION

The present invention relates to a combination of a motorbike and a fire extinguishing device, and comprises a motorbike having a base connected to the rear end thereof, and two support units extend from two sides of the base respectively and each support unit has a retractable support rod. A support stand is pivotably connected to the rear end of the base and capable of being positioned at a retracted first position and an extended second position. When the two support rods are extended, the motorbike is lifted upward and the rear wheel of the motorbike is lifted from the ground. When the support stand is pivoted to the second position, the two support units are retracted and the support stand contacts against the ground. A foam-type fire extinguishing device is connected to the base.

The primary object of the present invention is to provide a motorbike with a foam-type fire extinguishing device connected thereto, wherein the motorbike is able to bear the reaction force when the foam-type fire extinguishing device is operated.

Another object of the present invention is to provide a foam-type fire extinguishing device that is able to be used in different types of buildings and the foam-type fire extinguishing device is quickly sent to desired areas to extinguish the fire by the motorbike.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
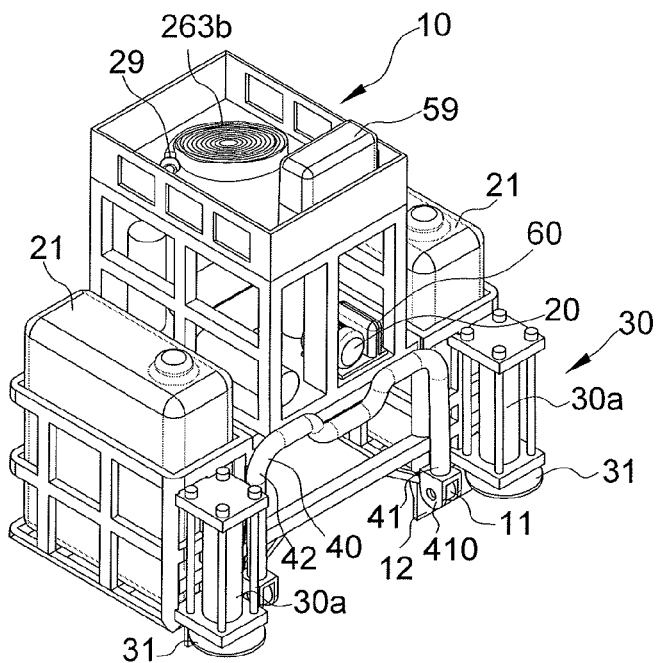
FIG. 1 shows the foam-type fire extinguishing device of the present invention, wherein the support stand is pivoted upward.
Figure 2:
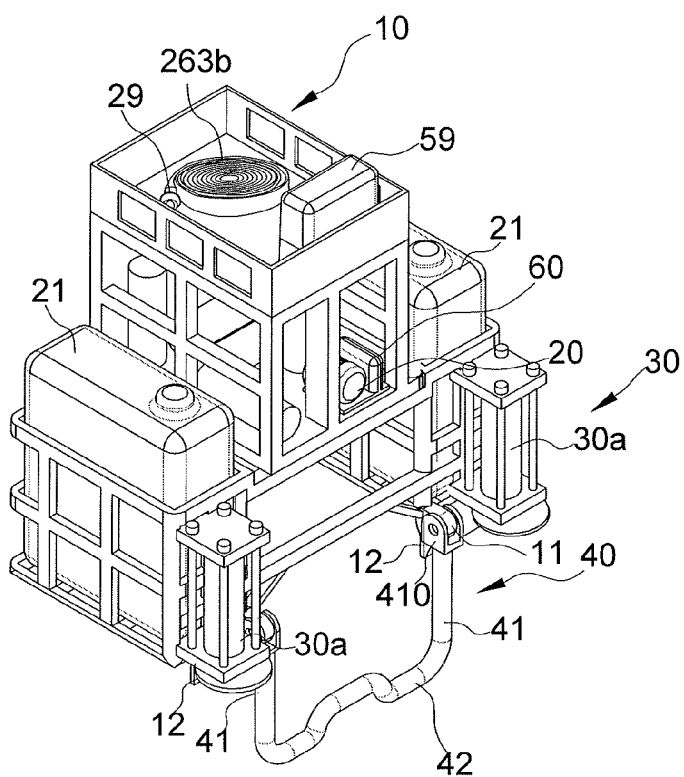
FIG. 2 shows the foam-type fire extinguishing device of the present invention, wherein the support stand is pivoted downward.
Figure 3:
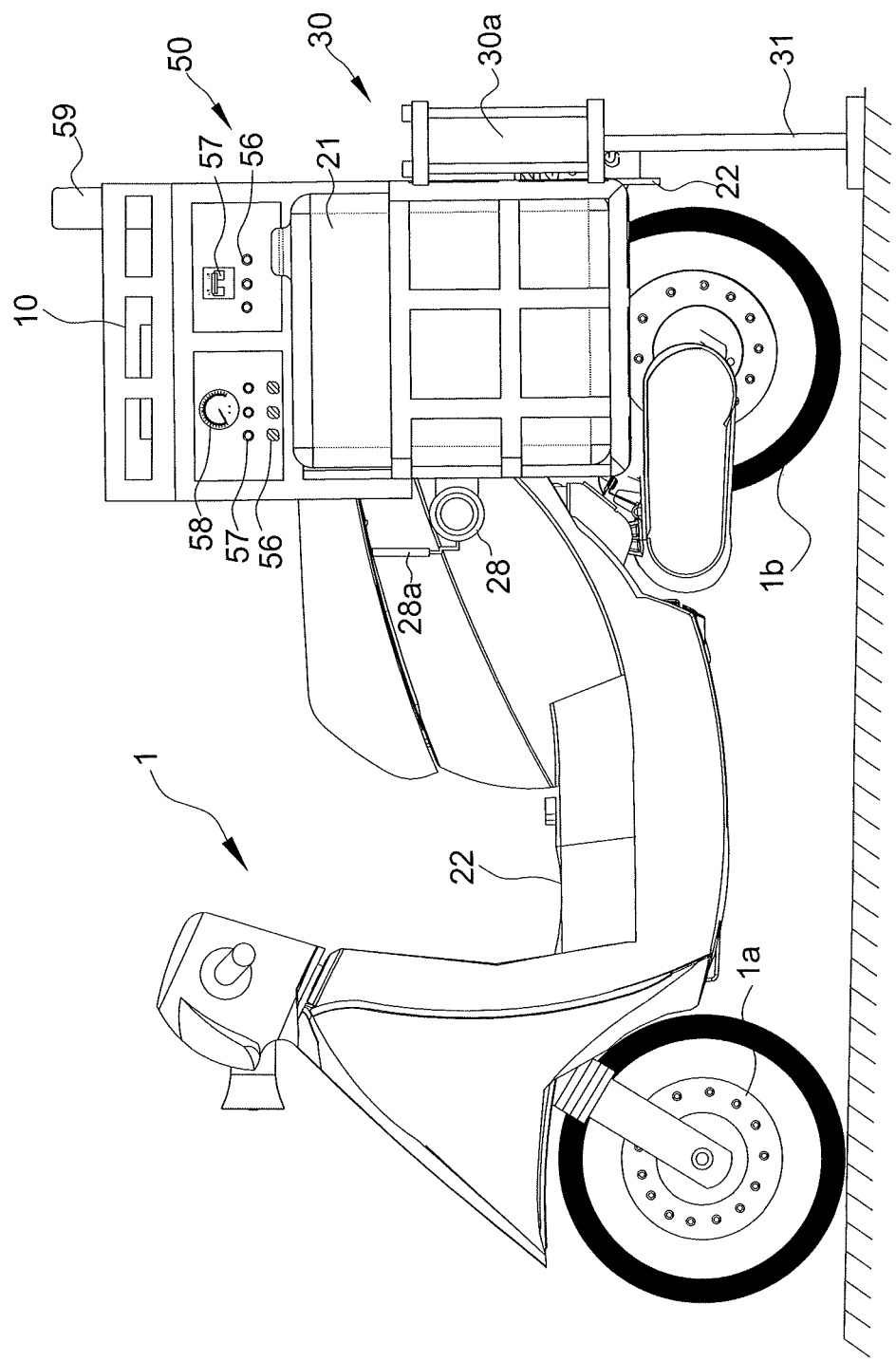
FIG. 3 shows that the foam-type fire extinguishing device of the present invention is connected to the motorbike and the two supports rods are extended.
Figure 4:
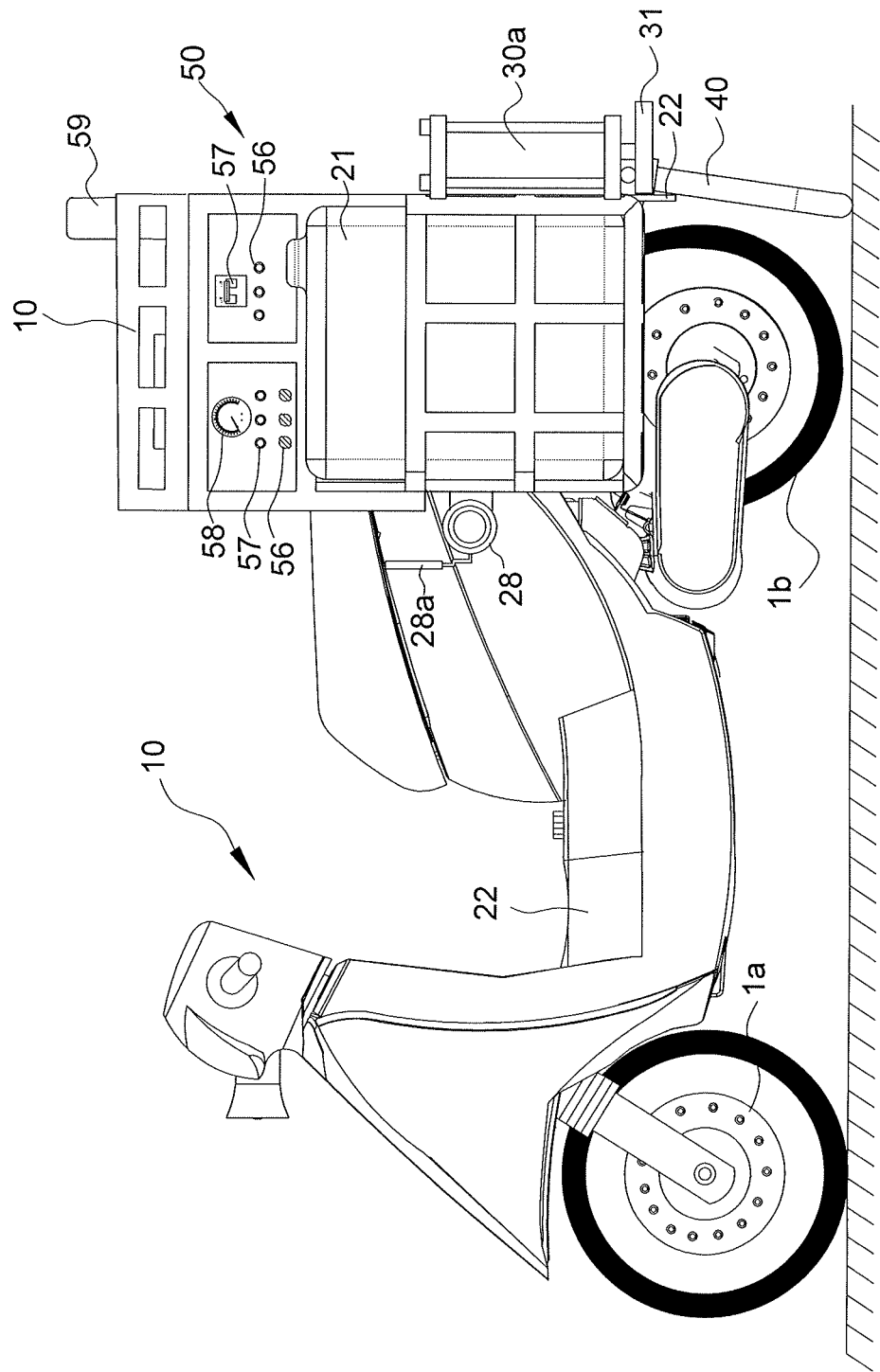
FIG. 4 shows that the foam-type fire extinguishing device of the present invention is connected to the motorbike and the two supports rods are extended, and the support stand lifts the motorbike up.
Figure 5:
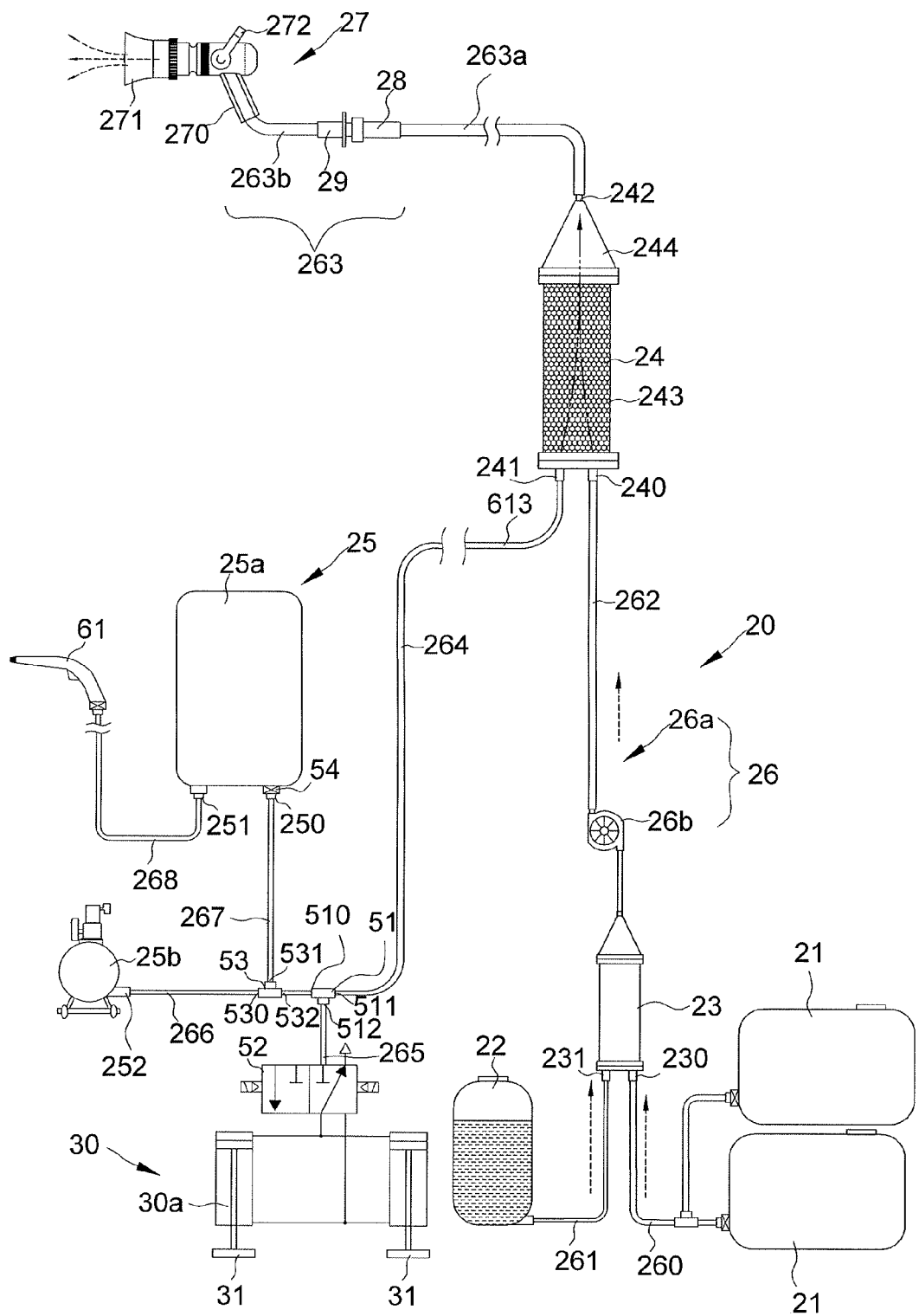
FIG. 5 shows the arrangement of the foam-type fire extinguishing device of the present invention.

Referring to FIGS. 1 to 4, the present invention comprises a motorbike 1 having a base 10 connected to the rear end thereof. A foam-type fire extinguishing device 20 connected to the base 10. Two support units 30 extend from two sides of the base 10 respectively. In this embodiment, the two support units 30 each are a cylinder 30a as shown in FIG. 5, and each cylinder 30a has a retractable support rod 31. A support stand 40 is pivotably connected to the rear end of the base 10 and capable of being positioned at a retracted first position and an extended second position. As shown in FIG. 3, wherein a distance between the rear end of the base 10 and a central axial line of the front wheel 1a being larger than a distance between a central axial line of the rear wheel 1b and the central axial line of the front wheel 1a. When the two support rods 31 are extended, the motorbike 1 is lifted upward and the rear wheel 1b of the motorbike 1 is lifted from the ground as shown in FIG. 3. When the support stand 40 is pivoted to the second position, the two support rods 31 of the support units 30 are retracted by the operation of the control module 50, and the support stand 40 contacts against the ground, so that the motorbike 1 is supported by the front wheel 1a and the support stand 40 as shown in FIG. 4 so that the motorbike 1 can bear the reaction force when the foam-type fire extinguishing device 20 of the present invention is operated. The support stand 40 comprises two parallel upright sections 41 and a transverse section 42 which is connected between two lower ends of the two upright sections 41. The two upright sections 41 each have a pivotal portion 410 on the top thereof. The base 10 has two pivots 11 on the rear end thereof, the pivots 11 are connected to the two pivotal portions 410. Two stops 12 extend from the rear end of the base 10 and are located beside the two pivots 11 respectively so as to restrict the support stand 40 at the second position. Two resilient members 13 are respectively connected between the two pivots 11 and the support stand 40. When the support stand 40 is positioned at the second position, the two resilient members 13 are stretched. When the support stand 40 is pivoted to the first position, the two resilient members 13 are retracted.

As shown in FIGS. 1-4, the second embodiment of the present invention comprises a base 10, a foam-type fire extinguishing device 20 connected to the base 10, and two support units 30. In this embodiment, the two support units 30 each are a cylinder 30a as shown in FIG. 5, and each cylinder 30a has a retractable support rod 31. A support stand 40 is pivotably connected to the rear end of the base 10 and capable of being positioned at a retracted first position and an extended second position. When the two support rods 31 are extended, the motorbike 1 is lifted upward and the rear wheel 1b of the motorbike 1 is lifted from the ground. When the support stand 40 is pivoted to the second position, the two support rods 31 of the support units 30 are retracted, and the support stand 40 contacts against the ground, so that the motorbike 1 is supported by the front wheel 1a and the support stand 40 so that the motorbike 1 can bear the reaction force when the foam-type fire extinguishing device 20 of the present invention is operated.

As shown in FIG. 5, the foam-type fire extinguishing device 20 comprises two first containers 21 for providing water, a second container 22 for receiving foam agent therein, a mixing tank 23, an increasing pressure tank 24, a pressure device 25, a transmitting unit 26 and a spray device 27.

The mixing tank 23 has a first inlet 230 connected with the two first containers 21, a second inlet 231 connected with the second container 22, and a first exit 232. The increasing pressure tank 24 having a third inlet 240 connected with the first exit 232, a fourth inlet 241, and a second exit 242. The pressure device 25 is connected with the fourth inlet 241 and the two cylinders 30a. The transmitting unit 26 delivers the water and the foam agent at a ratio to the mixing tank 23 to create water-foam mixture. The water-foam mixture comprises 0.3-0.5 by weight of foams and 100 by weight of water. The water-foam mixture is sent to the increasing pressure tank 24, the pressure device 25 introduces pressurized air into the increasing pressure tank 24 to create fine foams of the water-foam mixture.

The spray device 27 has an input end 270 and an output end 271. The input end 270 is connected with the second exit 242 of the increasing pressure tank 24. The spray device 27 has a trigger 272 to control the water-foam mixture in the increasing pressure tank 24 to be sprayed from the output end 271.

The transmitting unit 26 comprises a path 26a and a pump 26b. The path 26a has a first pipe 260 connected with the first container 21 and the first inlet 230. A second pipe 261 is connected with the second container 22 and the second inlet 231. A third pipe 262 is connected with the first exit 232 and the third inlet 240. A fourth pipe 263 is connected with the second exit 242 and the input end 270. The pump 26b is connected to the third pipe 262.

The increasing pressure tank 24 comprises a cylindrical body 243 and a cone-shaped cover 244. The increasing pressure tank 24 has an open first end and a closed second end, the cone-shaped cover 244 seals the open first end, and the third inlet 240 and the fourth inlet 241 are connected to the closed second end. The second exit 242 is located at the tip of the cone-shaped cover 244. This arrangement accelerates the water-foam mixture to be ejected from the second exit 242. The fourth pipe 263 comprises a tenth pipe 263a and a hose 263b, the tenth pipe 263a is connected between the second exit 242 and a receptacle member 28. The hose 263b is connected between the output end 271 and a connector 29 which is connected to the receptacle member 28.

The present invention further comprise a control module 50 and a power supply unit 60. The control module 50 controls the operation of the support units 30 and the foam-type fire extinguishing device 20. The power supply unit 60 provides power to the foam-type fire extinguishing device 20. As shown in FIG. 5, the control module 50 has a first outlet 511 which is connected with a first tri-tube 51 of the pressure device 25, a control valve unit 52, a second tri-tube 53 and a pressure switch 54. The first tri-tube 51 has a first outlet 511 and a second outlet 512. A fifth pipe 264 is connected between the first outlet 511 and the fourth inlet 241. A sixth pipe 265 is connected between the second outlet 512 and the cylinders 30a. The pressure device 25 comprises a higher pressure storage bottle 25a and a compressor 25b. The compressor 25b has a first air exit 252. The higher pressure storage bottle 25a has an air-inlet 250 and a second air exit 251. A seventh pipe 266 is connected between the first air exit 251 and an entrance 530 of the second tri-tube 53. The second tri-tube 53 has a first outlet 531 and a second outlet 532. An eighth pipe 267 is connected between the air-inlet 250 and the first outlet 531. The second outlet 512 is connected to the entrance 510 of the first tri-tube 51. A ninth pipe 268 is connected between an air nozzle 61 and the first air exit 251. The air nozzle 61 can be the spray device 27 or a connector. The higher pressure storage bottle 25a has a pressure switch 54 which is electrically connected with the compressor 25b. When the pressure in the higher pressure storage bottle 25a reaches a pre-set value, the pressure switch 54 shuts off the compressor 25b. The sixth pipe 265 is connected with the control valve unit 52 which controls the operation of the cylinders 30a, and the operation of the support rods 31.

As shown in FIGS. 3 to 5, when the motorbike 1 is parked, the control module 50 is activated to extend the two support rods 31 to lift the motorbike 1 upward and the rear wheel 1b of the motorbike 1 is lifted from the ground as shown in FIG. 3. When the support stand 40 is pivoted to the second position, the two support rods 31 of the support units 30 are retracted by the operation of the control valve unit 52 to the status as shown in FIG. 4, and the support stand 40 contacts against the ground, so that the motorbike 1 is supported by the front wheel 1a and the support stand 40 as shown in FIG. 4 so that the motorbike 40 can bear the reaction force when the foam-type fire extinguishing device 20 of the present invention is operated. On the contrary, when the rider wants to ride the motorbike 1, the support stand 40 is pivoted upward and the control valve unit 52, so that the two support rods 31 are extended to lift the motorbike 1 and the rear wheel 1b is lifted. The support stand 40 is then pivoted to the first position, the control valve unit 52 is then shut off, the two support rods 31 are retracted, so that the rider can ride the motorbike 1.

Figure 6:
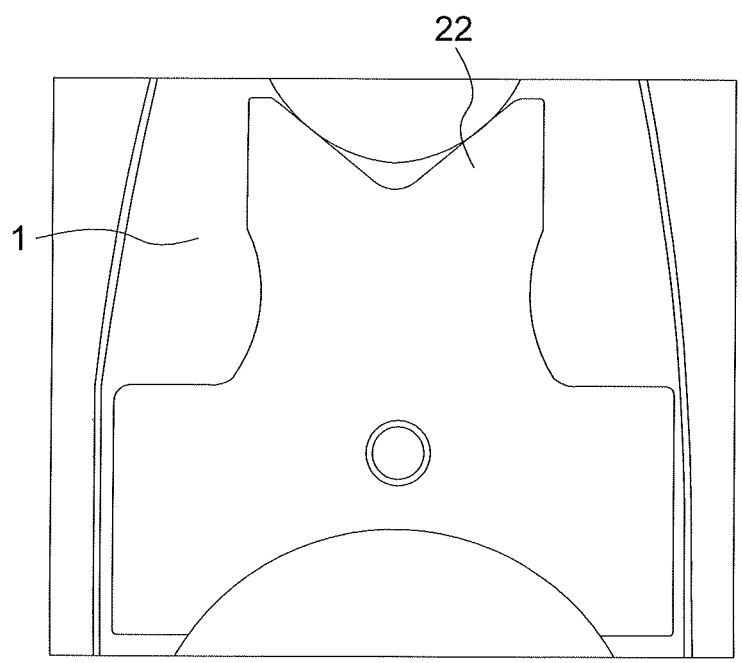
FIG. 6 shows that the second container is put on the deck of the motorbike.

As shown in FIG. 6, the second container 22 is put on the deck of the motorbike 1 to increase the volume of the water-foam mixture. The control module 50 further comprises multiple buttons 55, multiple indication lights 56, a power switch 57, an air pressure meter 58 and a warning light 59. When the user presses the button 55, the compressor 25b and the pump 26b are activated, the compressor 25b introduces high pressurized air into the higher pressure storage bottle 25a, the pump 26b sends the water of the first container 21 and the foam agent of the second container 22 to the mixing tank 23 to form the water-foam mixture. The water-foam mixture is then sent to the increasing pressure tank 24 which provides pressure to the water-foam mixture to create more fine foams. Because the direction that the water-foam mixture enters into the increasing pressure tank 24 is parallel with the direction that the pressurized air enters into the increasing pressure tank 24, so that the water-foam mixture and the pressurized air move smoothly. The second exit 242 of the increasing pressure tank 24 is located at the tip of the cone-shaped cover 244, so that stream of the water-foam mixture can move at higher speed. The larger space in the increasing pressure tank 24 allows more fine foams to be created. The user pulls the trigger 272 and the water-foam mixture is ejected from the output end 271. The water-foam mixture comprises 0.3-0.5 by weight of foams and 100 by weight of water. A valve (not shown) can also be used to adjust the ratio of the water and the foams.

The foam-type fire extinguishing device 20 connected to the base 10 on the motorbike 1 and the motorbike 1 is firmly and stably parked, so that the motorbike 1 can bear the reaction force from the foam-type fire extinguishing device 20. The resistance of the delivery of the water-foam mixture is reduced, and the number of the parts of the foam-type fire extinguishing device 20 is simplified. The water-foam mixture contains more fine foams and covers a larger area to effectively extinguish the fire.

While we have shown and described the embodiment in accordance with the present invention, it should be clear to those skilled in the art that further embodiments may be made without departing from the scope of the present invention.

What is claimed is:

1. A combination of a motorbike and a fire extinguishing device, comprising:
   a motorbike having a front wheel and a rear wheel for standing on a ground, a base connected to a rear end thereof, two support units extending from two sides of the base respectively and each support unit having a retractable support rod, a support stand pivotably connected to a rear end of the base and capable of being positioned at a retracted first position and an extended second position, wherein a distance between the rear end of the base and a central axial line of the front wheel being larger than a distance between a central axial line of the rear wheel and the central axial line of the front wheel; the support stand comprising two parallel upright sections and a transverse section, the two upright sections each having a pivotal portion on a top thereof, the transverse section being connected between two bottom ends of the two upright sections respectively, the base having two pivots on the rear end thereof, the pivots being connected to the two pivotal portions so that the support stand is pivotably connected to the rear end of the base and capable of being positioned at a retracted first position and an extended second position; wherein when the two support rods are extended, the motorbike is lifted upward and the rear wheel of the motorbike is lifted from the ground; wherein when the support stand is pivoted to the second position, the two support rods of the support units are retracted by the operation of the control module, and the support stand contacts against the ground, so that the motorbike is supported by the front wheel and the support stand;
   two stops extending from the rear end of the base and locating beside the two pivots respectively so as to restrict the support stand at the second position;
   two resilient members being respectively connected between the two pivots and the support stand, wherein when the support stand is positioned at the second position, the two resilient members are stretched, when the support stand is pivoted to the first position, the two resilient members are retracted; and
   a foam-type fire extinguishing device connected to the base.

2. The combination as claimed in claim 1, wherein the two support units each are a cylinder, the foam-type fire distinguishing device comprises two first containers for providing water, a second container for receiving foam agent therein, a mixing tank has a first inlet connected with the two first containers, a second inlet connected with the second container and a first exit, an increasing pressure tank has a third inlet connected with the first exit, a fourth inlet and a second exit, a pressure device is connected with the fourth inlet and the two cylinders, a transmitting unit delivers the water and the foam agent at a ratio to the mixing tank to create water-foam mixture, the water-foam mixture is sent to the increasing pressure tank, the pressure device introduces pressurized air into the increasing pressure tank to create fine foams of the water-foam mixture, a spray device has an input end and an output end, the input end is connected with the second exit of the increasing pressure tank, the spray device has a trigger to control the water-foam mixture in the increasing pressure tank to be sprayed from the output end.

3. The combination as claimed in claim 2, wherein the transmitting unit comprises a path and a pump, the path has a first pipe connected with the first container and the first inlet, a second pipe is connected with the second container and the second inlet, a third pipe is connected with the first exit and the third inlet, a fourth pipe is connected with the second exit and the input end, the pump is connected to the third pipe.

4. The combination as claimed in claim 2, wherein the increasing pressure tank comprises a cylindrical body and a cone-shaped cover, the increasing pressure tank has an open first end and a closed second end, the cone-shaped cover seals the open first end, the third inlet and the fourth inlet are connected to the closed second end, the second exit is located at a tip of the cone-shaped cover.

5. The combination as claimed in claim 2, wherein the fourth pipe comprises a tenth pipe and a hose, the pipe is connected between the second exit and a receptacle member, the hose is connected between the output end and a connector which is connected to the receptacle member.

6. The combination as claimed in claim 2, wherein the water-foam mixture comprises 0.3-0.5 by weight of foams and 100 by weight of water.

7. The combination as claimed in claim 2, wherein the pressure device is connected with a first tri-tube which has a first outlet and a second outlet, a fifth pipe is connected between the first outlet and the fourth inlet, a sixth pipe is connected between the second outlet and the cylinders, the pressure device comprises a higher pressure storage bottle and a compressor, the compressor has a first air exit, the higher pressure storage bottle has an air-inlet and a second air exit, a seventh pipe is connected between the first air exit and an entrance of the second tri-tube, the second tri-tube has a first outlet and a second outlet, an eighth pipe is connected between the air-inlet and the first outlet, the second outlet is connected to the entrance of the first tri-tube, a ninth pipe is connected between an air nozzle and the first air exit, the air nozzle is the spray device, the higher pressure storage bottle has a pressure switch which is electrically connected with the compressor, when a pressure in the higher pressure storage bottle reaches a pre-set value, the pressure switch shuts off the compressor, the sixth pipe is connected with a control valve unit to control operation of the cylinders.

* * * * *